(12) United States Patent
Morovic et al.

(10) Patent No.: US 10,523,847 B2
(45) Date of Patent: Dec. 31, 2019

(54) TRANSFORMING COLOR MAPPINGS

(71) Applicant: Hewlett-Packard Development Company, L.P., Houston, TX (US)

(72) Inventors: Jan Morovic, London (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/760,788

(22) PCT Filed: Jan. 29, 2016

(86) PCT No.: PCT/EP2016/051933
§ 371 (c)(1),
(2) Date: Mar. 16, 2018

(87) PCT Pub. No.: WO2017/129253
PCT Pub. Date: Aug. 3, 2017

(65) Prior Publication Data
US 2018/0262652 A1  Sep. 13, 2018

(51) Int. Cl.
*H04N 1/60* (2006.01)
*G06K 15/10* (2006.01)

(52) U.S. Cl.
CPC ......... *H04N 1/6058* (2013.01); *G06K 15/102* (2013.01); *H04N 1/605* (2013.01); *H04N 1/6033* (2013.01); *H04N 1/6036* (2013.01); *G06K 2215/0094* (2013.01)

(58) Field of Classification Search
None
See application file for complete search history.

(56) References Cited

U.S. PATENT DOCUMENTS

| 7,116,441 B1 * | 10/2006 | Matsuoka | H04N 1/6058 358/1.9 |
|---|---|---|---|
| 8,363,273 B2 | 1/2013 | Morovic et al. | |
| 2010/0103188 A1 * | 4/2010 | Sasaki | G09G 5/003 345/590 |
| 2012/0162239 A1 | 6/2012 | Marcu et al. | |
| 2014/0016143 A1 | 1/2014 | Morovic et al. | |

FOREIGN PATENT DOCUMENTS

| WO | WO-2007024494 | 3/2007 |
|---|---|---|
| WO | WO-2014117803 | 8/2014 |

OTHER PUBLICATIONS

Morovic, J. et al., "HANS—A New Color Separation and Halftoning Paradigm", Nov. 2011. Color and Imaging Conference, Society for Imaging Science and Technology, vol. 2010.

* cited by examiner

*Primary Examiner* — Andrew H Lam
(74) *Attorney, Agent, or Firm* — HP Inc. Patent Department

(57) ABSTRACT

In an example, a method includes characterising, using at least one computer, an initial gamut from an initial set of color mappings from a source color space to a printing device color space. The method may further include characterising, using at least one computer, an initial gamut from an initial set of color mappings from a source color space to a printing device color space. The method may further include characterising, using the at least one computer, a printing device color gamut. The method may further include transforming, using the at least one computer, the initial set of color mappings to form a transformed set of color mappings mapping from the source color space to the printing device color gamut.

15 Claims, 3 Drawing Sheets

TRANSFORMING COLOR MAPPINGS

BACKGROUND

Color mappings are used to map between color spaces. For example, when printing an image, the data representing that image may describe the colors in a first color space, for example in terms or reds, greens and blues (an RGB color space), but it may be intended to print the image using set of colors from a different color space, such as Cyan, Yellow, Magenta and Black (a CYMK color space). A mapping, for example represented in a lookup table, may link the two color spaces such that a particular combination of colors of one color space can be used to reproduce or represent the colors from another color space.

Establishing a color mapping may comprise producing and analysing sample color patches, in some examples in an iterative manner.

BRIEF DESCRIPTION OF DRAWINGS

Non-limiting examples will now be described, with reference to the accompanying drawings, in which.

DETAILED DESCRIPTION

Figure 1:
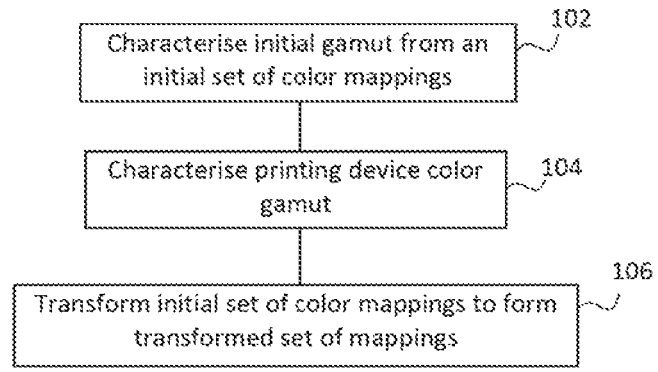
FIG. 1 is an example of a method for transforming a set of color mappings.

FIG. 1 shows a method, which may for example be a computer implemented method of transforming a set of color mappings, comprising, in block 102, characterising an initial gamut from an initial set of color mappings. The initial set of color mappings maps from a source color space to a printing device color space. A color gamut is a range of colors producible or available in a printing process or with a given device. Thus, different color reproduction techniques, different sets of mappings, different printing systems and different display devices may all have different color gamuts. In this example, the initial gamut may be the range of colors that may be printed by a printing device using the mappings of the initial set of mappings.

In some examples, the mappings of the initial set of color mappings may map from a source color space which is independent of a proposed printing device. For example the source color space may be defined in relation to RGB or sRGB vales, or use an International Commission on Illumination (CIE) color model. In other examples, the source color space may be based on a color space model such as Hue-Saturation-Value (HSV), Hue-Saturation-Lightness (HSL), or the like.

The printing device color space may be defined with reference to at least one print agent (for example, colorants such as Inks and toners) of a printing device. The printing device may for example be a specific printing device, or a class of printing devices. For example, the printing device may be a printing device which comprises Cyan, Yellow, Magenta and Black inks associated with a CYMK color space. In some examples, the printing device color space may be described by n-dimensional vectors, where n is the number of inks used by the printing device and the vector components represent quantities of each ink available on the color printing device. In some examples, the printing device color space may be defined in terms of Neugebauer Primaries, as is described in greater detail below.

In some examples, characterising the initial gamut comprises measuring the colors of a test image. In some examples, a test image used to characterise an initial gamut comprises a plurality of patches, each intended to represent a uniform color, and each being representative of the output of a mapping of the initial set of color mappings. The test image may be printed by the printing device. The test image may comprise an output of all the mappings of the initial set of color mappings or a sampling of the set. Characterising the initial gamut may further comprise measuring the colors of the patches to determine colorimetries such that a relationship between a printed print agent/print agent combination and colorimetry can be established. The range in the measured colorimetries may then be used to characterise the initial gamut.

In other examples, characterising the color gamut may comprise estimating a gamut from the mappings into the printing device color space. For example this may comprise estimating or predicting the printed colors (or the colorimetries of printed print agents/print agent combinations) which would be output by a printing device using print instructions determined according to the initial set of color mappings based on, for example, an International Color Consortium (ICC) profile associated with the print agents or print agent combinations specified in the initial mappings.

The gamut accessed by a set of mappings may not access the full available color gamut of a printing device. For example, the relationship between the quantity of each ink color used and the color of the resulting printed ink combination can be highly non-linear. As a result of this non-linearity, if an attempt is made to access the full gamut of a printing device by making incremental changes in ink amounts, the achieved gamut may include concavities when plotted in a three dimensional color space. These concavities in some cases result in relatively dull dark colors being printable. In addition, small changes in a system comprising non-linear relationships may also result in unacceptably large changes in output color. Therefore, non-linear relationships in a printing system may make it challenging to obtain printing properties such as smooth transitions between colors, cost per copy, color constancy, and grain.

An initial gamut may therefore be suboptimal in that it fails to cover the all, or substantially all, of the possible printing device color gamut, i.e. there may be colors available to a printing device (i.e. colors which are within that printing device's color gamut) which will not be accessed by the initial set of color mappings.

In contrast, if a convex gamut could be determined for the printing device, this may exhibit a broader range of colors than a gamut having at least one concavity. A convex gamut may be associated with relative computational simplicity compared to concave gamuts or gamuts of undetermined geometry.

In some examples, it may that the initial gamut exhibits deficiencies, such as a range of colors which is smaller in at least some areas than may be desirable. It may be known that an initial gamut comprises concavities. In some examples, it may be intended to verify or ensure that a gamut to be used in printing is convex and/or covers substantially all the available printing device color gamut.

It has been proposed that a printing device color space may be described in terms of proportional area coverages for print agents available for use by the printing device, for example, Neugebauer Primary area coverage (NPac) vectors. A fully characterised set of NPacs will represent a convex gamut, and may therefore be considered to be a superset of any other representations of printing device color space. In other words, a fully characterised set of NPacs can be considered to represent a maximum accessible gamut of the printing device.

To introduce NPacs in greater detail, Neugebauer equations are tools for characterizing color printing systems. The Neugebauer equations are associated with colors referred to as the Neugebauer Primaries (NPs), which in a binary (bi-level) printing device (i.e. the printing device is able to use either no ink or one drop of ink at a single pixel per ink channel), are the $2^n$ combination of n inks, wherein the application of each of the n inks is at either 0% or 100% within an n-dimensional ink space. Generally, the number of Neugebauer Primaries (NPs) is $k^n$, where k is the number of levels at which a print agent (for example, colorants such as inks and toners) can be used and n is the number of print agents available to a particular (or particular class of) printing device. For example, for a printing device comprising six different inks either 0, 1, or 2 drops of each ink may be specified at each pixel, resulting in $3^6$ or 729 Neugebauer Primaries (NPs). These NPs may therefore define all of the possible ink configuration states that a single pixel can have.

In some examples, print agent limits may be included in at least one, and in some examples, each, NP. For example, if a printing device can dispense two drops of a single print agent at a given pixel, this may be too much for the type of substrate that a printing device is printing on. Therefore, the print agent amounts may be defined within each NP to provide a color for a given printing system corresponding to a specific substrate. For example, a specific Neugebauer Primary (NP) may be defined to utilize 1.5 drops of the color cyan and 1 drop of magenta per pixel. While it may be that, as a printing device may dispense whole but not partial drops, this could not be achieved at a single pixel, utilizing a mean amount over several pixels would allow such a color combination to be used. In such examples, the printing device color gamut may be a 'within print agent limits' printing device color gamut, or a substrate specific printing device color gamut.

As discussed in greater detail below, once the hull of a convex gamut has been defined, the hull of this gamut may be tessellated into polytopes, and colors represented by an NPac, which may be stated in terms of the enclosing set of vertices (each of the vertices being an NP), each being associated with a weighting. NPacs may represent linear, convex combinations of NPs (with relative area coverages being the reflected by the weights). As all of a printing device's NPacs are accessible, all colors inside the convex hull of a printing system's Neugebauer Primaries' colors can be addressed.

NPacs, or other representations within a printing device color space, may be subject to a halftoning process to produce control data which is used to determine where drops of print agent will be distributed and where they will not. For example this may determine whether a drop of a particular ink will be applied to a particular pixel on the substrate. Techniques for halftoning include error diffusion and dithering using of halftone threshold matrices or masks (for example, based on blue or green noise distributions, or clustered dots or the like).

Block 104 of FIG. 1 comprises characterising the gamut of a printing device. This gamut may be the 'full' or at least substantially (for example, as fully as may be practically sampled) the maximum gamut of the printing device (or in some examples, the maximum 'within print agent limit', or substrate specific color gamut). In some examples, this may comprise characterising a convex gamut for the printing device, for example based on NPs as described above.

In some examples, this characterisation may comprise printing at least one test image, the test image(s) sampling at least substantially the entire gamut of the printing device (i.e. sampling across all available combinations of NPs). In examples in which the color mappings are mappings to proportional coverage representations for print agents available for use by the printing device (for example NPacs), characterising the printing device color gamut of a printing device may comprise printing at least one test image, the test image(s) representing all, or a sample of, within-print agent limit proportional coverages available to the printing device. In some examples, the sampling may be as complete as is practical.

As noted above, a fully characterised set of NPacs may provide access to the full printing device color gamut. However, in practise, determining such a gamut may comprise printing color patches which sample the color space and, although in some examples the set of color patches may be selected so as to be spaced throughout the color space, it may be the case that the gamut of the initial set of mappings exhibits at least one color which is not characterised in relation to the set of NPacs used to print the samples. For that reason, in some examples, the initial gamut and the printing device color space color gamut may be combined in order to ensure that mappings to all modelled colorimetries are captured.

Characterising the printing device color gamut may comprising building an ink-limited NP chart using ink-limited $K^n$ Neugebauer Primary (NP) values. The convex hull may be calculated by choosing the number of NPs enclosing all of the available colors to the printing device. In an example, 16 Neugebauer Primaries (NPs) may be chosen where these 16 NPs are vertices of the entire convex hull of the gamut. However, in other implementations, any number of NPs may be necessary to enclose the convex hull of the gamut. In this example, those 16 NPs may for example include: W (blank paper), c (light cyan), M (magenta), Y (yellow), R (red), G (green), V (violet), m (light magenta), cY, cG, cV, Mm, YR, YG, KN (black and gray overprinted), Rm. It may be noted that these combinations include no more than 2 inks. Therefore, any color within the color gamut may then be matched using the vertices of up to four of these 16 Neugebauer Primaries (NPs).

The given set of Neugebauer Primaries (NPs) can be convexly combined to describe the corresponding NPac, and a plurality of NPac patches representing the values may be printed, measured and the resulting measurements expressed in a color space. For example, the color space may be a CIEXYZ color space. The convex hull may be defined by the color space coordinates of at least one of the Neugebauer Primaries (NPs).

Individual colors within the gamut may be identified based on, for example, a tessellation carried out on a characterised gamut. A tessellation is a collection of polytopes (e.g., polygons in two dimensions, polyhedra in three dimensions) that fill the hull of the color gamut with no overlaps or gaps. In one implementation, the tessellation is performed using the Delaunay Tessellation technique. In other implementations, other tessellation techniques may be used. For example, a set of tetrahedra that span the convex hull of the color gamut may be determined. For any color within the convex hull that is accessible, the tetrahedron that encompasses that color can be found. The color may be expressed in terms of the corresponding barycentric coordinates defined by the vertices of the enclosing tetrahedron (which are NPs) and the weighting. In such an example, the barycentric coordinates of the color are the area coverages for the corresponding tetrahedron vertex NPs, or NPacs. Given any pair of NPac vectors, any color along the line between their colors in the color space can be obtained by interpolation, resulting in a smooth transition between the various colors in the color space.

In block 106, the initial set of color mappings is transformed to map from the source color space to the printing device color gamut. By transforming the initial set of color mappings, rather than determining a full set of color mappings into the characterised printing device color gamut, processing resources and/or verification processes may be reduced.

In examples, at least a subset of the mappings of the initial set is retained in the transformed set. In some examples, the transformed set of mappings comprises at least one new mapping, wherein the new mapping is a mapping determined based on the determined printing device color gamut. In some examples, transforming the initial set of color mappings may comprise retaining the color mappings for at least portions of the initial gamut, and determining color mappings from the source color space to the printing device color space for regions of the printing device color gamut which are outside the initial color gamut (i.e. to map to print agent combinations which were not expressed within the initial set of color mappings). The color mappings may be determined by determining a specific color mapping for some colormetries (for example, those at the edge of the color gamut) and determining other color mappings through interpolation.

Figure 2:
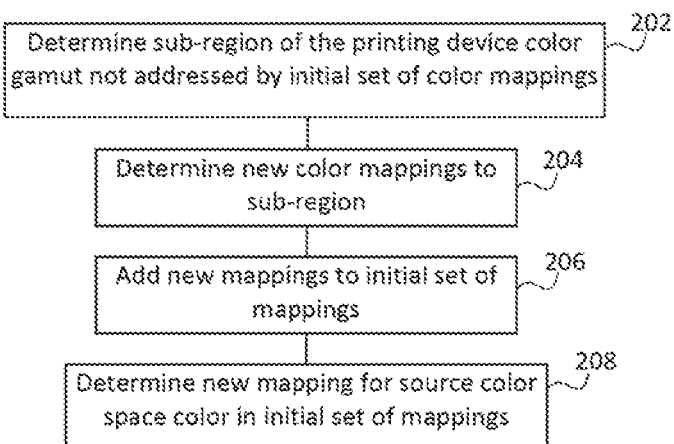
FIG. 2 is an example of a method of a transformation of a set of color mappings.

FIG. 2 shows an example of a process of block 106 in greater detail. In this example, block 202 comprises determining a sub-region of the printing device color gamut which is not addressed by the initial set of color mappings. This could for example be an area of concavity in the original color gamut, but which is represented in a convex gamut. For example, this could result in a great range in at least some colors such as brighter colors. This may for example be the case for secondary colors of a printing device. For example, where the printing device prints in Cyan, Magenta, Yellow and Black (CMYK), increased brightness may be seen in reds (MY), greens (CY) and blues (CM).

In block 204, new color mappings from the source color space to the sub-region of the printing device color gamut are determined: while the initial set of color mappings may have mapped to a set of NPacs exhibiting a certain range, for example a level of brightness in a particular hue, the new color mappings may for example map to a greater range (for example, brighter representations of that hue).

In some examples, a new mapping may be determined by associating the colorimetry (for example, determined in a device independent CIEXYZ color space) of a printed patch with the color specified in the source color space. The color in the initial the source color space is then associated with the NPac used to form the patch. Mappings for intermediate colors may be determined using interpolation (for example, it may be impractical to print all possible patches). In some examples, determining a new mapping may utilize the printing device color gamut. For example, the new mapping may be derived from that gamut. In examples, this may comprise tessellating the characterised printing device color gamut into polytopes utilizing a tessellation technique, selecting a set of some number of, for example four, enclosing vertices (which may be NPs or NPacs) and combining these on the basis of barycentric coordinates by assigning weights to the vertices of the polytope, the result being an NPac vector.

Every color in an NP-based color gamut can be obtained by as many NPac combinations as there are polytopes that enclose it. Alternative NPac vectors that correspond to a given color may provide alternatives from which a choice may be made. Different choices may result in different outputs. For example, one of the choices may use less ink, one of the choices may be most color constant, and one of the choices may be closest to the spectral reflectance of an original. As such, determining a new mapping may comprise selecting one of a plurality of color mappings.

Block 206 comprises combining the at least one new color mapping with at least a subset of the initial set of color mappings, in this example by adding the new color mapping(s).

In block 208, for a source color space color associated with a mapping in the initial set of color mappings, a new mapping of the source color space color to the printing device color gamut is determined. In some examples, this new mapping may be a 'native' mapping into the characterised printing device color gamut, for example using tessellation techniques. This therefore considers a color in in the other sub-region of the printing device color gamut to that considered in block 204, i.e. that sub-region which is also addressed by the initial set of color mappings. In some examples, the new output of the new mapping may be printed and measured. In other examples the colorimetry may be estimated, for example based on an ICC profile or the like.

Block 210 comprises comparing the (estimated or measured) color output by the mapping of the initial set of color mappings with the (estimated or measured) color output by the new mapping. If it is determined in block 212 that the color differs by less than a predetermined threshold (for example this may comprise determining if the colors are within some ΔE, as the term is used by the CIE, for example ΔE2000), block 214 comprises retaining the original mapping. If the color differs by at least a predetermined threshold, block 216 comprises replacing the color mapping in the initial set of color mappings with the new color mapping.

Therefore, in this example, the initial set of color mappings is transformed in two senses. In block 206, new mappings are added to the initial set if they correspond to a previously un-mapped color region, and in block 216, some mappings of initial set of color mappings may be replaced with newly determined mappings in the event of an above-threshold color difference.

Figure 3:
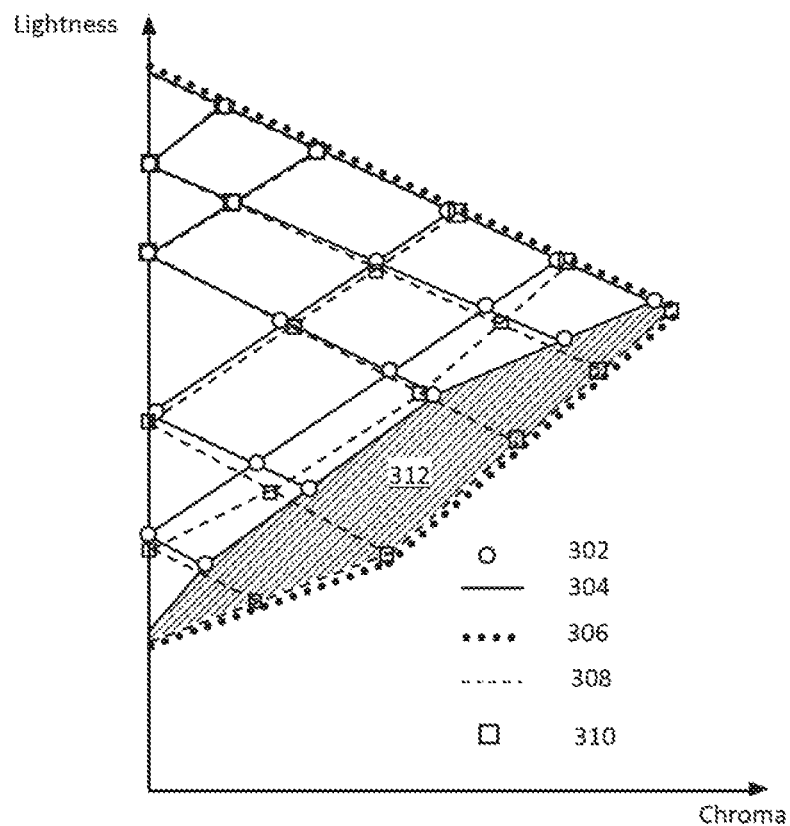
FIG. 3 is a schematic representation of an example color space.

This is illustrated in FIG. 3, which represents a color space in a plane of constant hue angle. FIG. 3 shows colorimetries of the initial set of color mappings as the intersections 302 of solid grid lines, the initial gamut being represented by the region underlying the solid line grid 304.

The dotted line 306 represents the extent of printing device color gamut, for example characterised as described in relation to block 104. The intersections 310 of dashed line grid 308 represent the native mappings into the characterised printing device color gamut. It will be noted that the dotted line 306 encloses an area 312 which extends beyond the initial gamut. In this region, new mappings may be determined as set out in relation to block 204 of FIG. 2, and added to form a transformed set of color mappings, for example according to block 206.

In addition, it may be noted that, while some intersections 302 representing the initial mappings are close to the intersections 310 representing the 'native' mappings, others are further apart. Where their separation exceeds a threshold, the initial mappings may be replaced with a newly determined native mapping to form a transformed set of color mappings. In this example, the size of the squares and circles indicating the intersections 302, 310 may be considered to be representative of the threshold: where the square/circles at least partially intersect, this may indicate the colors are within the threshold, whereas no intersection may indicate that the threshold is exceeded and the mapping should be replaced.

In other examples, the initial set of color mappings may be transformed in a third sense, by adding other new mappings, for example by interspersing the existing mappings with new mappings (which may be native mappings determined from the printing device color gamut, for example according to the tessellation techniques described above), providing a more detailed set of mappings.

New mappings may be untested, and may therefore be subject to a verification process in which new mappings may be explicitly tested, for example by printing a sample or test patch according to the new color mapping, and measuring the colorimetry of that sample. There may be several candidate new mappings, and a selection process may be carried out to determine a mapping for use in a transformed set of mappings. By contrast, mappings contained in the initial set of color mappings may be considered to be pre-verified and need not therefore be subjected to verification.

By retaining at least some of the mappings in the initial set, a fully verified set of color mappings with fewer processing stages.

Figure 4:
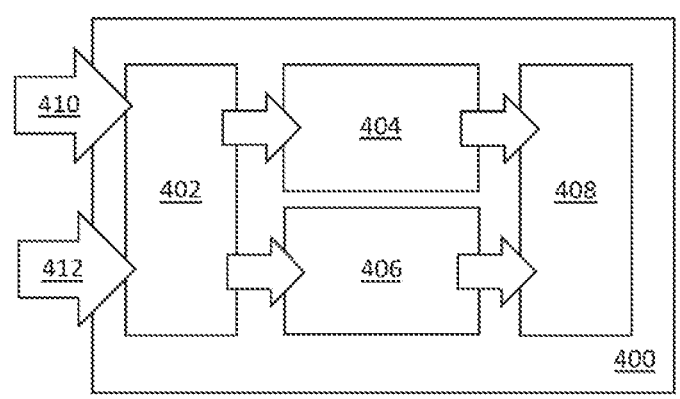
FIG. 4 is a schematic representation of an example processing apparatus.

FIG. 4 shows a processing apparatus 400 comprising an interface 402, an analysis module 404, a mapping module 406 and a transformation module 408. The interface 402 receives a first set of color mappings 410, the first set of color mappings 410 comprising color mappings from a source color space to a printing device color space. This may for example comprise a look-up table. The color mappings 410 may be received from a memory, which may be local or remote to the processing apparatus 400, or from any other data source. The interface 402 also receives data 412 characterising a printing device color gamut. The data 412 may for example be the result of analysis of test patches sampling the full gamut of a particular printing device (or particular class of printing device), for example as discussed in relation to block 104 above. This data 412 may be received from any data source, which may be local to or remote from the processing apparatus 400.

Each of the modules 404, 406, 406 may be implemented in hardware, for example as at least one processor.

The analysis module 404 characterises the gamut represented by first set of color mappings, for example by printing and measuring or by estimating the colors represented in the mappings. In some examples, this may be carried out as described in relation to block 102 above.

The mapping module 406 determines a second set of color mappings from the source color space to the printing device color gamut. These may be determined, for example, using the tessellation techniques described above to determine proportional coverage representations such as NPacs, and/or may comprise utilising printed and measured color mappings. The second set of color mappings may be a sampling of at least part of the characterised printing device color gamut. The second set of color mappings may comprises at least one color mapping to a region of the printing device color gamut which was not within the gamut represented by first set of color mappings as characterised by the analysis module 404. In some examples, the second set of color mappings may comprise at least one color mapping to a region of the printing device color gamut which was within the gamut represented by first set of color mappings as characterised by the analysis module 404.

The transformation module 408 transforms the first set of color mapping based on the second set of color mappings. In an example, this may comprise combining at least one of the second set of mappings with at least a subset of the first set of mappings. In an example, the transformation module 408 may transform the first set of color mappings by adding new mappings from the second of set of color mappings. In one such example, the transformation module 408 may determine if any of the second set of color mappings extends to a gamut region outside the gamut of first set of color mappings. In such examples the transformation module 408 may transform the first set of color mappings by adding new mappings from the second of set of color mappings which extend to a gamut region which is outside the first set of color mappings. In another example, the transformation module 408 determines, for a color of the color source space, if the output color of the mapping for that color into the printing device color space differs between the first and the second set of color mappings. The output color(s) may for example be estimated, or may be printed and measured. If the output color differs by more than a predetermined amount, the transformation module 408 may transform the first set of color mappings by replacing the mapping for that color of the color source space with the mapping for that color from the second set of color mappings. In some examples, the transformation module 408 may output a transformed set of color mappings.

In an example, an image (which may be a still digital image or a digital video image) may be uploaded to the processing apparatus 400, or may be retrieved from a previously generated image set contained on a storage media, or retrieved from a remote storage location, such as an online application, using the Internet. The image may comprise colors which are defined in the source color space. This image may be processed for printing using the transformed set of color mappings by the processing apparatus 400, and the resulting mappings used to determine control data for a printing device such as an inkjet printing device, a laser printing device, line printing device, a solid ink printing device, or a digital printing device, which may print the image onto any substrate, for example any variety of paper (lightweight, heavyweight, coated, uncoated, paperboard, cardboard, etc.), films, foils, textiles, fabrics, plastics or the like. The processing apparatus 400 may for example comprise personal computer, a laptop computer, a desktop computer, a digital camera, a personal digital assistance device, a cellular phone, or some other processing apparatus.

Figure 5:
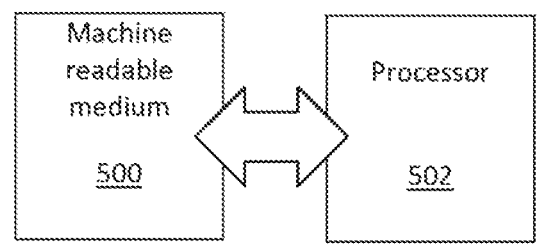
FIG. 5 is an example of a machine readable medium in conjunction with a processor.

FIG. 5 shows an example of a non-transitory machine readable medium 500 associated with a processor 502. The machine readable medium 500 comprises instructions which, when executed by the processor 502, cause the processor 502 to characterise an initial gamut from an initial set of color mappings, the initial set of color mappings mapping from a source color space to a printing device color space in which proportional combinations of print agents to be used in representing a color are specified (for example, as an set of NPacs).

The instructions further cause the processor 502 to determine a printing device color gamut associated with all proportional combinations of print agents available to a printing device. This may comprise printing a sampling of all available (or usable) proportional combinations of print agents.

The instructions may further cause the processor 502 to expand the initial set of color mappings to map to the printing device color gamut. This may comprise adding mappings to a gamut region not addressed by the initial set of mappings (i.e. a gamut region represented in the printing device color gamut and not in the initial gamut) and/or may comprises interspersing the mapping of the initial set with intermediate mapping(s) so as to increase the number of mappings within both the printing device and the initial color gamuts.

In some examples, the instructions may further cause the processor 502 to replace at least one mapping of the initial set of color mappings with a new mapping to the determined printing device color gamut.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' and 'processing circuitry' is to be interpreted broadly to include a CPU, processing unit, ASIC, logic unit, or programmable gate array etc. The methods and functional modules (for example the analysis module 404, the mapping module 406 and/or the transformation module 408) may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow in the flow charts and/or block in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method, comprising:
 characterizing, using at least one computer, an initial gamut from an initial set of color mappings from a source color space to a printing device color space;
 characterizing, using the at least one computer, a printing device color gamut; and
 transforming, using the at least one computer, the initial set of color mappings to form a transformed set of color mappings mapping from the source color space to the printing device color gamut.

2. A method according to claim 1 further comprising:
 determining, using the at least one computer, at least one new color mapping from the source color space to the printing device color gamut;
 wherein transforming the initial set of color mappings comprises combining the at least one new color mapping with at least a subset of the initial set of color mappings to form the transformed set of color mappings.

3. The method according to claim 1 further comprising:
 determining, using the at least one computer, a sub-region of the printing device color gamut which is not addressed by the initial set of color mappings; and
 determining, using the at least one computer, at least one new color mapping from the source color space to the sub-region of the printing device color gamut;
 wherein transforming the initial set of color mappings comprises combining the at least one new color mapping with at least a subset of the initial set of color mappings to form the transformed set of color mappings.

4. The method according to claim 1 further comprising:
 using the at least one computer, determining, for a source color space color in the initial set of color mappings, a new mapping of the source color space color to the printing device color gamut; and
 comparing, using the at least one computer, a color output by a mapping of the initial set of color mappings with a color output by the new mapping;

wherein transforming the initial set of color mappings comprises:

when the colors output differ by less than a predetermined threshold, retaining the color mapping from the initial set of color mappings and when the color differs by at least a predetermined threshold, replacing the color mapping from the initial set of color mappings with a new color mapping to the printing device color gamut.

5. The method according to claim 1 in which at least one of the initial set of color mappings and the transformed set of color mappings comprise mappings to proportional coverage representations of print agents available for use by a printing device for which the printing device color gamut is determined.

6. The method according to claim 1 in which characterizing the printing device color gamut comprises:

printing at least one test image, the at least one test image sampling the printing device color gamut; and
measuring a colorimetry of the test image.

7. The method according to claim 6 in which characterizing the printing device color gamut further comprises merging the measured colorimetry with the initial gamut.

8. The method according to claim 1 in which characterizing the initial gamut comprises printing a test image comprising color patches printed according to the color mappings of the initial set of color mappings, and measuring a colorimetry of the test image.

9. The method according to claim 1 in which characterizing the initial gamut comprises estimating a gamut from the color mappings into the printing device color space.

10. The method according to claim 1 further comprising determining at least one new color mapping from the source color space to the printing device color gamut;

printing a sample of the new color mapping; and
verifying that the colorimetry of the printed sample corresponds to a predicted colorimetry.

11. A processing apparatus comprising
an interface to receive (i) a first set of color mappings, the first set of color mappings comprising color mappings from a source color space to a printing device color space, and (ii) data characterizing a printing device color gamut;
an analysis module to characterize an initial gamut represented by the first set of color mappings;
a mapping module to determine a second set of color mappings, the second set of color mappings being from the source color space to the printing device color gamut; and
a transformation module to transform the first set of color mappings based on the second set of color mappings.

12. The processing apparatus according to claim 11 in which:

the transformation module is to determine when any of the second set of color mappings extends to a gamut region which is outside the initial gamut and to transform the first set of color mappings to include mappings from the second of set of color mappings which extend to a gamut region which is outside the initial gamut.

13. The processing apparatus according to claim 11 in which:

the transformation module is to determine, for a first color of the source color space, when the mapping for that color into the printing device color space results in an output color which differs between the first and the second set of color mappings, and, when the output color differs by more than a predetermined amount, to transform the first set of color mappings by replacing the mapping for that color in the first set of color mappings with the mapping for that color from the second set of color mappings.

14. A non-transitory machine readable medium comprising instructions which, when executed by a processor, cause the processor to:

characterize an initial gamut from an initial set of color mappings, the initial set of color mappings comprising color mappings from a source color space to a printing device color space in which proportional combinations of print agents to be used in representing a color are specified;
determine a printing device color gamut associated with all proportional combinations of print agents available to a printing device; and
expand the initial set of color mappings to map to the printing device color gamut.

15. A non-transitory machine readable medium according to claim 14 further comprising instructions which, when executed by a processor, cause the processor to:

replace at least one mapping of the initial set of color mappings with new mapping determined based on the determined printing device color gamut.

* * * * *